United States Patent [19]

Dor

[11] 4,010,239
[45] Mar. 1, 1977

[54] IRON OXIDE SORBENTS FOR SULFUR OXIDES
[75] Inventor: Abraham A. Dor, Lakewood, Ohio
[73] Assignee: The Hanna Mining Company, Cleveland, Ohio
[22] Filed: Oct. 5, 1973
[21] Appl. No.: 403,952
[52] U.S. Cl. .................................. 423/244; 423/634
[51] Int. Cl.$^2$ .................. C01B 17/60; C01G 49/06
[58] Field of Search .......... 423/244, 634, 632, 242, 423/558; 75/1

[56] References Cited
UNITED STATES PATENTS

| | | | |
|---|---|---|---|
| 1,412,452 | 4/1922 | Coolbaugh | 423/244 |
| 2,202,414 | 12/1938 | Barnes | 423/153 |
| 3,075,919 | 1/1963 | Gruber | 423/634 |

FOREIGN PATENTS OR APPLICATIONS

| | | | |
|---|---|---|---|
| 1,043,304 | 11/1958 | Germany | 423/634 |
| 183 | 1/1873 | United Kingdom | 423/244 |
| 2,987 | 12/1858 | United Kingdom | 423/244 |
| 1,003,419 | 9/1965 | United Kingdom | 423/244 |
| 4,199 | 7/1818 | United Kingdom | 423/242 |
| 951,087 | 3/1964 | United Kingdom | 75/115 |

OTHER PUBLICATIONS

Abraham et al. "Magnetic Sequioxide of Iron", Nature, Jun. 13, 1925 p. 930, No. 2902, vol. 115.

Primary Examiner—Oscar R. Vertiz
Assistant Examiner—Gary P. Straub
Attorney, Agent, or Firm—Donnelly, Maky, Renner & Otto

[57] ABSTRACT

A highly sorbent iron oxide is prepared by reducing hematite to magnetite followed by a low temperature oxidation prior to contact with sulfur dioxide. The oxidized solids obtained in this manner are a more effective form of iron oxide sorbent for the oxides of sulfur.

5 Claims, 4 Drawing Figures

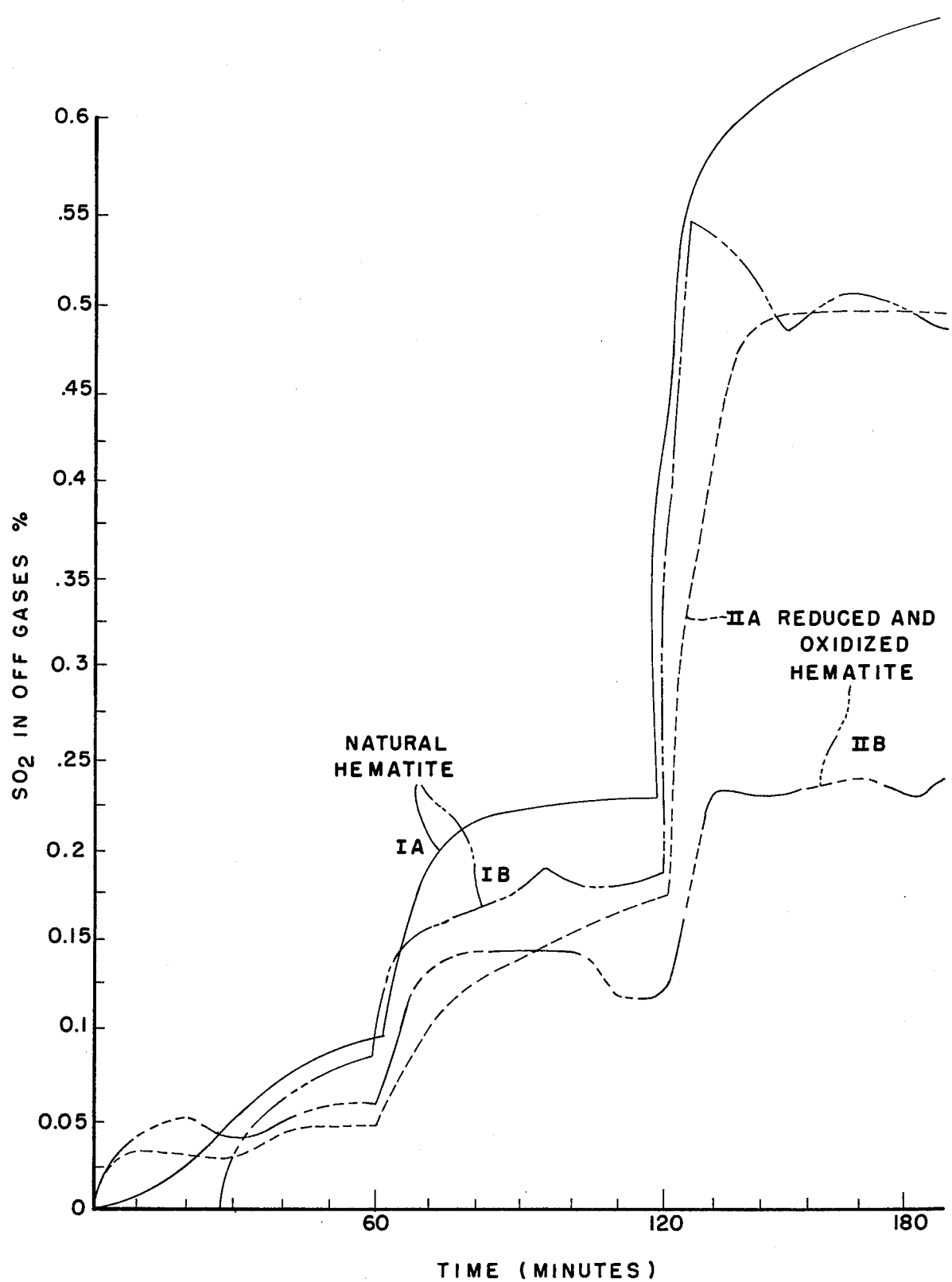

IRON OXIDE SORBENTS FOR SULFUR OXIDES

BACKGROUND OF THE INVENTION

This invention relates generally to an iron oxide sorbent for the oxides of sulfur contained in plant waste gases, and more particularly, to a procedure for preparing an active synthetic hematite sorbent for sulfur dioxide. The invention also relates to the removal of sulfur from gases containing sulfur and oxygen.

Air pollution with sulfur dioxide is a major problem in the United States today. Sulfur dioxide is objectionable principally because above relatively low concentrations it is toxic to human beings and animals and is destructive to vegetation. Sulfur dioxide and its oxidation products, sulfur trioxide and sulfuric acid, are a major source of acidity in rain and fog which in turn can be very corrosive.

At the present time, the largest amount of industrial sulfur oxide emissions results from the combustion of certain types of coal and oil which contain appreciable amounts of sulfur. Waste gas streams containing sulfur dioxide similarly are produced by other industrial processes such as in the smelting of sulfur-bearing minerals, the refining of sulfur-containing crude oils, the syntheses of sulfuric acid, the sulfonation of hydrocarbons, the production of coke, the production of sulfur in a Claus process, the production of paper by way of a wood-pulping process, and similar industrial processes.

Furthermore, the discharge of these gas streams containing sulfur dioxide into the atmosphere constitutes a waste of a valuable material because the sulfur contained therein is an industrial commodity. Currently, tens of millions of tons of sulfur oxides are released into the atmosphere over populated regions of the United States each year. Thus, the recovery of some of this sulfur dioxide either as such or in another form could result in the accumulation of a supply of useful chemicals of definite value.

Many processes have been proposed for removal of sulfur dioxide from these gas streams. Most of the proposed removal procedures which have been suggested utilize liquid sorption in which the sulfur dioxide containing gases are intimately contacted with an aqueous sorbent which typically contains chemicals in solution or in slurry which will chemically or physically react with the sulfur dioxide and absorb the same into the liquid solution. Examples of such sorbents include the oxides, hydroxides and carbonates of ammonia, the alkali metals, and the alkaline earth metals.

One disadvantage of the wet sorption process is that the sorption of the sulfur dioxide must occur at a rather low temperature. This results in cooling of the gases which are ultimately discharged to the atmosphere. Such cool gases will remain near ground level thus causing pollution of the ambient air at ground level which may be as serious as that presented by the untreated flue gas.

Other methods have been suggested for removing sulfur oxides from flue gases. Attempts to desulfurize fuels prior to combustion have been costly and not always effective. For some fuels, such as coal, many processes investigated to date do not economically desulfurize fuel.

Additive processes have been suggested wherein materials having the ability to combine with sulfur oxides are added either to the fuel or to the combustion gases. Additives which have been employed include soda, limestone, magnesia, and magnesite, but such additives generally are costly.

Dry adsorption also has been suggested. Sulfur dioxide can be adsorbed at low temperature by materials such as aluminum oxide, activated carbon, and silica gel. A disadvantage of such adsorption processes is that they also require relatively low temperatures and have similar drawbacks to those of the wet absorption process described above.

Solid acceptors which absorb sulfur oxides also have been reported. Examples of such acceptors include alkalized alumina which is converted to the aluminum sulfate and mixtures of alkali metal oxides and iron oxide which are also converted to the corresponding sulfates. One important advantage of these solid absorption processes is that they can be operated at elevated temperatures, and the gas which ultimately is discharged to the atmosphere is at an elevated temperature and is readily dissipated in the atmosphere. There continues to be a need, however, for solid acceptors which are economically acceptable in commercial scale sorption processes.

SUMMARY OF THE DISCLOSURE

These and other problems of removing sulfur oxides from gases containing dilute concentrations thereof can be reduced by utilizing iron oxide sorbents prepared in accordance with the process of the invention. The invention provides a procedure for improving the sorbent characteristics of iron oxides which are otherwise not very effective sorbents for sulfur dioxide. The starting material for the process of the invention can be either natural or synthetic hematite. The hematite is reduced to a synthetic magnetite. This synthetic magnetite can then be converted to the active sorbent of the invention by oxidizing said magnetite at a temperature below about 600° C. and preferably at a temperature below about 450° C. The iron oxide product obtained by this process exhibits improved sorbent properties for sulfur dioxide, and can be utilized in the purification of waste industrial gases containing the same.

BRIEF DESCRIPTION OF THE DRAWINGS

FIG. 4 is a graph showing comparative absorption in a simulated three stage absorption process of a natural hematite and the same natural hematite treated in accordance with the invention.

DESCRIPTION OF THE PREFERRED EMBODIMENTS

Figure 1:
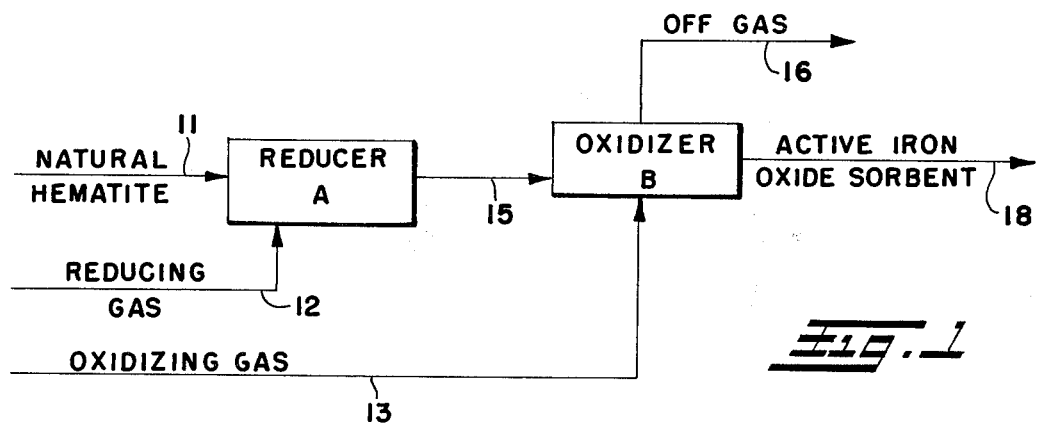
FIG. 1 is a flow diagram showing the formation of the active iron oxide sorbents of the invention.

The highly active iron oxide sorbents of this invention are obtained by reducing hematite to produce synthetic magnetite, and thereafter oxidizing the synthetic magnetite at a low temperature to produce hematite-bearing solids. The iron oxide utilized as the starting material of the process of this invention will depend upon availability of the raw materials. Natural or synthetic hematites can be utilized.

Most of the natural hematites are, to various degrees, useful as sorbents for sulfur dioxide. Many synthetic hematites and synthetic hematite-bearing solids also are, to various degrees, useful as sorbents for sulfur dioxide. However, the effectiveness of certain natural and synthetic hematites as sorbent materials can be improved by the process of this invention.

An example of the synthetic hematites useful in the process of this invention are those prepared by the oxidation of magnetite which may be either a natural or synthetic magnetite which is not itself a satisfactory sorbent for sulfur dioxide. Iron oxides obtained by the decomposition of iron compounds such as iron sulfates also can be treated in accordance with the process of the invention.

The process of this invention, therefore, provides a method for improving the sorbent properties of iron oxides. If the available iron oxide is natural or synthetic hematite, then the procedure of the invention involves two steps: the reduction of the hematite to synthetic magnetite and the low temperature oxidation of the synthetic magnetite to produce hematite. If the available starting material is magnetite, the procedure involves three steps: oxidation of the magnetite to synthetic hematite; reduction of the synthetic hematite to synthetic magnetite; and low temperature oxidation of the synthetic magnetite to hematite. It is essential to this invention that the final oxidation step be carried out at a low temperature. It is preferred that both the reduction of the hematite to magnetite and the final oxidation of magnetite be effected at a low temperature. The temperature of the reduction of the hematite may be as high as 1000° C. and preferably below about 700° C. The temperature of the final oxidation should be below about 600° C and is preferably below about 450° C.

The reduction of the hematite to magnetite can be effected with any of the known reducing agents which may be either gaseous, liquid or solid. Suitable gaseous reducing agents for the reduction include hydrogen, hydrogen containing gas mixtures, carbon monoxide, and carbon monoxide containing gas mixtures. When the reducing agent is a gaseous material, any equipment in which contact can be effected between a gas and a solid may be used for the reduction. For example, fixed bed, moving bed and fluid bed techniques may be utilized. The hematite also may be reduced by heating a mixture of the hematite with a solid reductant such as carbon, charcoal, coal or coke, or with a solid or liquid hydrocarbon such as Bunker C fuel oil, crankcase oil, or pitch.

The synthetic magnetite intermediate obtained by the above-described reduction of hematite is assumed to be produced by reactions such as the following:

$$3Fe_2O_3 + H_2 = 2Fe_3O_4 + H_2O \qquad (1)$$

$$3Fe_2O_3 + CO = 2Fe_3O_4 + CO_2 \qquad (2)$$

As mentioned above, the magnetite obtained by the reduction of the hematite is oxidized at a temperature below about 600° F. to produce a hematite-bearing solid which is an active sorbent for sulfur dioxide.

In theory, the oxidation of magnetite with air or oxygen proceeds as shown in the following equation:

$$4Fe_3O_4 + O_2 = 6Fe_2O_3 \qquad (3)$$

The product of this suggested oxidation reaction is a hematite-bearing solid which is more active as a sorbent than the initial hematite from which it is prepared. It has been observed that if the oxidation is allowed to occur at higher temperatures, the effectiveness of the product as a sorbent for sulfur is reduced.

The effectiveness of magnetites which are not very active as sorbents also can be improved by the process of the invention. These magnetites may be natural or synthetic magnetites which are not activated by the low temperature oxidation. For example, some synthetic magnetites prepared at elevated temperatures exhibit reduced effectiveness. In accordance with the process of this invention, such natural or synthetic mangetites are oxidized to hematite, reduced back to a hematite-bearing solid and oxidized at a low temperature. The end product is a more active iron oxide sorbent.

The iron oxides (principally hematite and hematite-bearing solids) obtained by the process described above are particularly effective sorbents for sufur dioxide from gases containing the same, particularly dilute concentrations of sulfur oxides in gases. The iron oxide reacts with the sulfur dioxide to form iron sulfates possibly in accordance with the following chemical equation:

$$2Fe_2O_3 + 3O_2 + 6SO_2 = 2Fe_2(SO_4)_3 \qquad (4)$$

The absorption temperature may range from about 250°–700° C. and preferably from about 325° to about 450° C. The iron oxide is placed in an absorbing unit containing one or more beds of the iron oxide. The beds may be of the fixed, moving or fluidized type. The sulfur and oxygen-bearing waste gases pass through these absorbing units and the oxides of sulfur are absorbed by the iron oxide forming iron sulfate, principally ferric sulfate.

The preferred embodiments of the invention are illustrated in the drawings and the specific examples which follow. FIG. 1 shows one arrangement of the process of the present invention for producing an iron oxide-bearing solid sorbent from hematite which may be either natural or synthetic hematite. Hematite is advanced as indicated by arrow 11 to reducer A which may be, for example, a fluid bed unit. Reducing gases essentially free of sulfur are fed into reducer A as indicated by arrow 12. The fluid bed preferably is operated at a temperature below 700° C.

A synthetic magnetite-bearing solid is recovered from reducer A as shown by arrow 15 and advanced to the oxidizer B. Oxidizing gas (as shown by arrow 13) is fed into the oxidizer in which the temperature of oxidation is maintained below about 600° C. and preferably from about 350° to about 450° C. in the oxidizer. A hot off gas exits from the oxidizer as indicated by arrow 16. A highly active iron oxide-bearing solid sorbent is withdrawn from oxidizer B as indicated by arrow 18. This sorbent may be utilized directly or sold as a commercial product.

Figure 2:
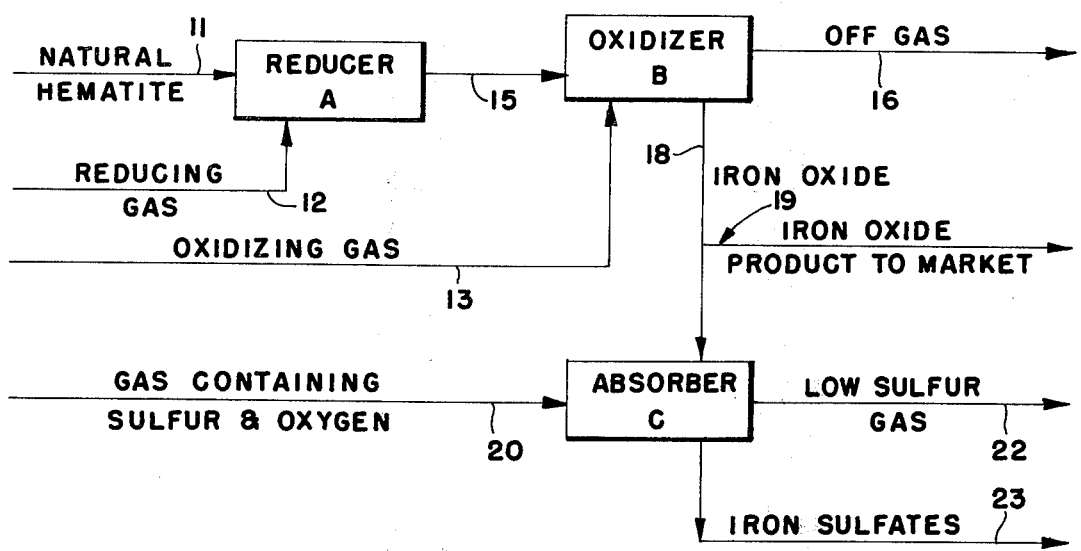
FIG. 2 is a flow diagram showing one modification of the operation of the process of this invention for producing the iron oxide sorbents of the invention and utilizing these sorbents in purifying gases containing sulfur dioxide.

The arrangement in FIG. 2 illustrates the process of this invention wherein the iron oxide-bearing solid sorbent obtained from oxidizer B is utilized in the absorption of sulfur dioxide from gases containing sulfur and oxygen. The portions of FIG. 2 which are similar to those of FIG. 1 have been given like numerals and letters. In FIG. 2, the iron oxide-bearing solid sorbent exiting from the oxidizing zone can be recovered as a commercial product as indicated by arrow 19 or utilized in the absorption of sulfur dioxide as indicated by arrow 18. This iron oxide (principally hematite) is fed to absorber C where it is contacted with a gas containing dilute concentrations of sulfur and oxygen. This sulfur and oxygen containing gas can be derived from waste gases as indicated by arrow 20. The sulfur and oxygen containing gas should be at a temperature such that the gas within absorber C is between about 250° and 700° C. If necessary, the gases fed into the absorption zone may be preheated (not shown). The sulfur and oxygen-bearing gases pass through the absorber, and the sulfur oxides react with the iron oxide to form iron sulfates.

The sulfur content in the product gas from absorber C is significantly reduced. The solid spent sorbent which is mainly iron sulfate is removed from the absorption zone as indicated by arrow 23 and is disposed of as desired.

Figure 3:
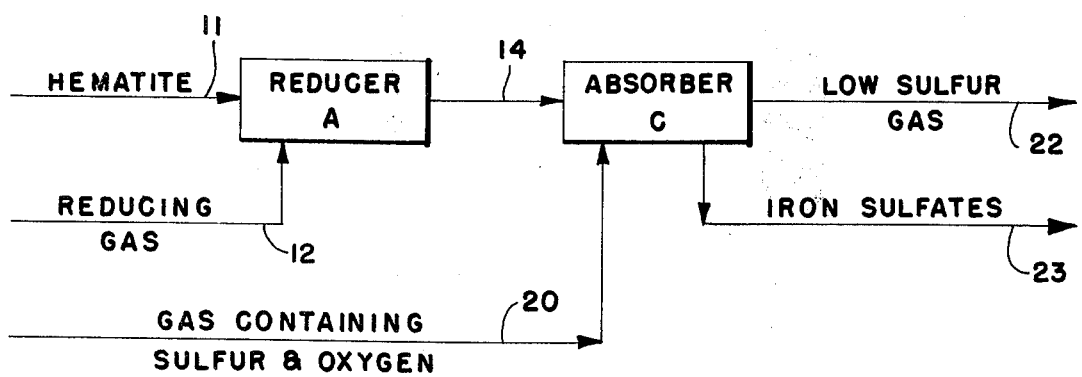
FIG. 3 is a flow diagram showing another modification of the invention where the reduced hematite is oxidized in the absorber.

In another modification of the invention shown in FIG. 3, the synthetic magnetite produced in reducer A is advanced to absorber C as indicated by arrow 14 where the magnetite is contacted with the gas containing sulfur and oxygen. The oxygen present in the gas oxidizes the magnetite to the active hematite which then reacts with sulfur dioxide to form iron sulfate. Thus, in this embodiment, the low temperature oxidation takes place in the absorber, and oxidizer B is eliminated as a separate unit.

The examples illustrated in FIGS. 1-3 demonstrate in a general way the utility of the invention in preparing an active iron oxide sorbent (principally hematite) for sulfur dioxide, and the use of such iron oxides for extraction of oxides of sulfur from gases containing the same. The following examples illustrate specific examples of the invention. Unless otherwise indicated, all parts and percentages are by weight.

EXAMPLE 1

A sample of natural hematite fines, ground and sized to −200 mesh is reduced to magnetite at a temperature of about 400° C. in a refractory lined chamber. A reducing gas comprising 11% CO, 16% $CO_2$ and 73% $N_2$ is passed through the chamber at the rate of 17.5 liters per minute. The hematite fines are heated under these conditions for nine hours while continuously rotating the chamber.

The above pre-reduced natural hematite (3,000 gms.) is added to a 4 inch fluid bed reactor with a full nitrogen flow from the bottom to the top of the reactor. A bed height of about 6 inches is obtained, and the material is heated. When the temperature of the reactor reaches approximately 350° C., a 1 hour pre-oxidation of the solids is effected with a gaseous mixture containing 2% oxygen.

At the end of the oxidation period, the oxygen concentration of the input gas is set to 2% and maintained at this level during the absorption. A three stage absorption operation is simulated by introducing a sulfur dioxide:nitrogen mixture in the input gas at a concentration of 0.2% $SO_2$ for the first hour, 0.4% $SO_2$ for the second hour, and 0.2% $SO_2$ for the third hour. A bed temperature of about 350° C. and a gas flow rate of 0.5 cubic feet per minute is maintained during the absorption test. During the three stages of absorption, the off gas is monitored for $SO_2$ content by titrating with a potassium iodate solution.

This example is carried out in duplicate (Samples IIA and IIB) and the average $SO_2$ in volume ppm in the off gas during each of the three stages is reported in Table 1. For comparison purposes, an untreated sample of the same natural fines of −200 mesh also is subjected to the same sorption test carried out in duplicate (Samples IA and IB) and these results are reported also in Table 1.

The specific percentage concentrations of $SO_2$ in the off gas at various times during each of the three absorption stages also are determined and are plotted in the graph identified as FIG. 4 for Samples IA and IB (untreated natural hematite) and Samples IIA and IIB. The improvement in the sorbent properties of natural hematite when subjected to reduction followed by low temperature oxidation prior to contact with the sulfur dioxide gas can be observed by reference to FIG. 4 which illustrates clearly the reduction in sulfur dioxide content in the off gases when the natural hematite is treated in accordance with the process of the invention.

EXAMPLE 2

This example illustrates the improvement obtained by the procedure of this invention where the low temperature oxidation occurs in the absorber.

The procedure of Example 1 is repeated except that the reduced Brazilian fines are not subjected to the oxidation treatment prior to contact with the gaseous mixture of oxygen and sulfur dioxide in the three stage absorption test. The average sulfur dioxide content in volume ppm in the off gas during the three stages utilizing this material (Sample III) is reported in Table 1. The results indicate that the prereduced Brazilian fines are not as effective as the natural fines during the first stage, but the sorbent properties of the prereduced Brazilian fines are improved during the second and third stages as compared to natural Brazilian fines.

TABLE 1

| Iron Compound | Sample | Average $SO_2$ in Off Gas (PPM) for $SO_2$ Input* of | | |
|---|---|---|---|---|
| | | 0.2% | 0.4% | 1.0% |
| Untreated Natural Fines | IA | 400 | 1750 | 5000 |
| | IB | 520 | 2175 | 6500 |
| Pre-reduced and Pre-oxidized Natural Fines | IIA | 500 | 1200 | 2400 |
| | IIB | 420 | 1440 | 4880 |
| Pre-reduced Natural Fines (not pre-oxidized) | III | 900 | 1500 | 3300 |

*With 2% $O_2$ in $N_2$

The embodiments of the invention in which an exclusive property or privilege is claimed are defined as follows:

1. In a process for removing sulfur oxides from a gas containing sulfur oxides and oxygen by contacting said gas with an iron oxide sorbent in an absorption zone at a temperature of from about 250° to about 700° C. to form iron sulfate-bearing solids and a gas reduced in sulfur oxide content, the improvement comprising the use of an iron oxide prepared by the process comprising the steps of
   a. providing a quantity of hematite,
   b. heating the hematite in the presence of reducing agents at a temperature below about 1000° C. to produce magnetite-bearing solids, and
   c. oxidizing said magnetite-bearing solids at a temperature below about 600° C. to produce an iron oxide-bearing sorbent.

2. The process of claim 1 wherein the oxidation of the magnetite-bearing solid occurs in the absorption zone.

3. The process of claim 1 wherein the hematite of step (a) is a natural hematite.

4. The process of claim 1 wherein the hematite of step (a) is a synthetic hematite obtained by the oxidation of magnetite.

5. The process of claim 1 wherein the magnetite-bearing solids are oxidized at a temperature below about 450° C.

* * * * *